(12) United States Patent
Payne

(10) Patent No.: US 6,206,504 B1
(45) Date of Patent: Mar. 27, 2001

(54) METHOD AND APPARATUS FOR TWO-COLOR INK JET POINT OF SALE (POS) PRINTING

(75) Inventor: Stephen R. Payne, Cortland, NY (US)

(73) Assignee: TransAct Technologies, Inc., Wallingford, CT (US)

( * ) Notice: Subject to any disclaimer, the term of this patent is extended or adjusted under 35 U.S.C. 154(b) by 0 days.

(21) Appl. No.: 09/544,941

(22) Filed: Apr. 7, 2000

(51) Int. Cl.[7] .............................. B41J 2/21; B41J 29/38
(52) U.S. Cl. ........................... 347/43; 347/9; 358/1.9
(58) Field of Search .................... 347/9, 43; 358/1.9, 358/1.18, 526

(56) References Cited

U.S. PATENT DOCUMENTS 5,483,625 * 1/1996 Robertson et al. .................... 358/1.9
5,519,815 * 5/1996 Klassen .................................. 347/9
5,563,985 * 10/1996 Klassen et al. ..................... 358/1.18

* cited by examiner

Primary Examiner—Thinh Nguyen
(74) Attorney, Agent, or Firm—Wall Marjama & Bilinski

(57) ABSTRACT

A 2-color ink jet point of sale (POS) printer includes a converter for converting full color printing commands into a commands for printing in two colors, a primary color and an alternate color. A three color image is possible when using the background color of the paper as a color.

6 Claims, 1 Drawing Sheet

METHOD AND APPARATUS FOR TWO-COLOR INK JET POINT OF SALE (POS) PRINTING

FIELD OF THE INVENTION

The invention pertains to the field of ink jet printers, and in particular, to a point-of-sale (POS) printer that prints two colors.

BACKGROUND OF THE INVENTION

There are two ways to define colors, CMY and RGB. CMY stands for Cyan, Magenta, and Yellow. Mixing cyan, magenta, and yellow can be compared to blending paint. When cyan, magenta, and yellow are amalgamated together, the result is black. CMY is sometimes known as CMYK, which stands for Cyan, Magenta, Yellow and black (so as not to be confused with Blue). These colors are sometimes called process colors, because you use them in four-color printing. If you have a typical full color printer, the inks used consist of these primary colors. The term "primary colors" mean that mixing these colors together can create all colors. Cyan, magenta and yellow are theoretically all one needs, but to save costly color inks many printers also have a black cartridge. The CMY color model is called a subtractive color model, because the process ink pigments "subtracts" or absorbs certain colors and reflects others.

RGB stands for red, green, and blue. Mixing red, green, and blue together can be compared to blending light beams. When the lights off, everything looks black. If all the lights are on, the result is white. The RGB model is used in a television or computer monitor. The colored spots of a TV screen emit three colors, and the sum of these colors determines the color you see. This is called an additive color model. Each color in the RGB system has a value for the amount of Red, Green and Blue in each picture element (pixel). In the internal Microsoft® Windows® image descriptions, this value goes from 0 to 255, where 0 for all three colors equals black, and 255 for all three colors equals white. This means that one can get more than 16 million different colors (TrueColor) because 256*256*256=16,777,216, but one can only get 256 shades of gray.

A full color printer forms the various colors of an image by mixing inks of different colors on the paper. That is, a full color printer uses the CMY or CMYK color system. The amount of each color determines the hue. Typically the paper is white and no ink produces a white dot. Mixing yellow and cyan produces a red dot and mixing cyan, magenta, and yellow in equal amounts produces a black or gray dot.

Hue describes what shade of color a particular color is, such as red, orange, indigo, or green. As in the rainbow, the starting and ending color is red. Hue can be described as a color circle with red at 0 degrees, yellow at 60 degrees clockwise, continuing with green, cyan, blue, magenta, and red again at 360 degrees. Saturation is a term used with how bright the color is.

There are a number of different types of printers commercially available, but not all types are suited to be POS printers. POS printers are used to print cash register receipts or credit card charge statements. Full color printing is not required, nor is the ability to print on different types of paper. POS printers tend to be compact so as not to clutter up a cashier's work area.

Many types of POS single color printers are commercially available. Dot matrix printers, thermal printers, and ink jet printers are all used because of their speed and reliability. POS color printers are rare in the marketplace. POS dot matrix color printers require a multi-colored ribbon, which adds to the complexity and size of the printer. Color thermal printers are under development, but it is hard to do color graphics on a thermal printer. In addition, special paper is required. Color ink jet printers are unsuitable for POS printers because adding three additional ink jet cartridges for full color (also known as 4-color, i.e., three colors plus black) would add width and complexity to the printer.

SUMMARY OF THE INVENTION

Briefly stated, a 2-color ink jet point of sale (POS) printer includes a converter for converting full color printing commands into a commands for printing in two colors, a primary color and an alternate color. A three color image is possible when using the background color of the paper as a color.

According to an embodiment of the invention, a method of converting a full color image to a three color image, wherein said three colors are a primary color, an alternate color, and a background color includes providing a color image on a host computer as display pixels, wherein said color image includes a combination of none, one, two, or all three of a first color, a second color, and a third color; converting each pixel to a corresponding printer command; determining a first color value, a second color value, and a third color value for each of said printer commands based on an intensity of said first color, said second color, and said third color present in said pixel; comparing each of first, second, and third color values for each printer command to a given threshold and designating a color value as ON if it exceeds a given threshold, and designating a color value as OFF if it is below or equal to said given threshold; and printing each printer command as (a) said primary color if all color values for said printer command are OFF, (b) said primary color if said first color value is ON and said second and third color values are OFF and said primary color is said first color; (c) said alternate color if said first color value is ON and said second and third color values are OFF and said alternate color is said first color; and (d) no color if all color values for said printer command are ON.

According to an embodiment of the invention, an apparatus for converting a full color image to a three color image, wherein said three colors are a primary color, an alternate color, and a background color includes means for providing a color image on a host computer as display pixels, wherein said color image includes a combination of none, one, two, or all three of a first color, a second color, and a third color; means for converting each pixel to a corresponding printer command; means for determining a first color value, a second color value, and a third color value for each of said printer commands based on an intensity of said first color, said second color, and said third color present in said pixel; means for comparing each of first, second, and third color values for each printer command to a given threshold and designating a color value as ON if it exceeds a given threshold, and designating a color value as OFF if it is below or equal to said given threshold; and means for printing each printer command as (a) said primary color if all color values for said printer command are OFF, (b) said primary color if said first color value is ON and said second and third color values are OFF and said primary color is said first color; (c) said alternate color if said first color value is ON and said second and third color values are OFF and said alternate color is said first color; and (d) no color if all color values for said printer command are ON.

DETAILED DESCRIPTION OF THE PREFERRED EMBODIMENT

Figure 1:
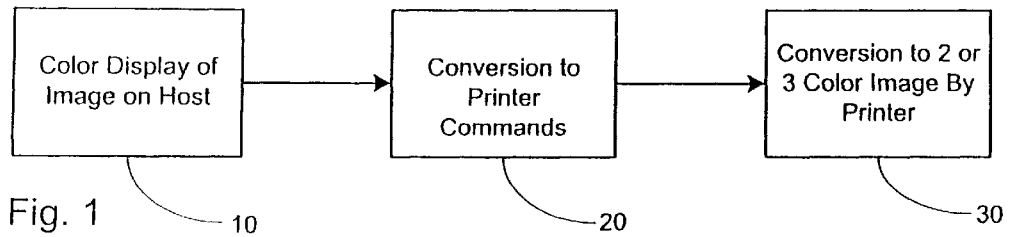
FIG. 1 shows a system according to an embodiment of the invention.

Referring to FIG. 1, a host system 10 contains a color image to be printed. Host system 10 is typically some type of computing device, preferably a PC or equivalent. The image is contained in the memory of host system 10, including color information for the image. "Color information" as used in this application means a color as that term is generally known, such as green, red, blue, yellow, orange, etc., but excluding black and white. The term "color" by itself includes black and white.

A driver 20 converts the image from host system 10 into commands that a printer 30 can understand. Various printer command protocols are known to those in the art. Driver 20 can be implemented in hardware, software, or a combination of hardware and software, and can be a separate device or contained in either host system 10 or printer 30.

Printer 30 converts the color information received from driver 20 into a printed image that contains a primary color, an alternate color, and a background color. The primary color and alternate color are provided by ink jet pens (cartridges) such as those manufactured and sold by Hewlett-Packard, while the background color is provided by the paper stock the image is printed on. The background color is usually white since most paper, including that typically used for receipts, is white. The primary color is usually black, but does not have to be black as long as it is available in ink jet cartridge form. The alternate color can be any color available in ink jet cartridge form.

A "color value" is defined as any combination of data that defines the intensity of a color for a dot/pixel. In the plural, "color values" means a combination of one or more color values that makes up all the color intensity information for a dot/pixel, since display pixels can include varying amounts of red, green, and blue (RGB) or cyan, magenta, and yellow (CMY). If a color value for a particular color exceeds a given threshold, that color value is ON. If a color value for a particular color is below a given threshold, that color value is OFF.

The preferred coding for converting a full color image to a 2-color image is as follows. If all color values are OFF, the primary color is printed. If all color values are ON, no printing is done, resulting in a dot (space) of the background color. If a color value is ON that is the same color as the alternate color, a dot of the alternate color is printed. If the primary color is something other than black, a dot of the primary color is printed if a color value is ON that is the same color as the primary color. Color values communicated to printer 30 for a particular dot/pixel that do not fit the aforementioned cases are ignored, i.e., no color is printed resulting in a dot of the background color. This is summarized in Table 1.

TABLE 1

| Primary Color | Alternate Color | Result |
| --- | --- | --- |
| ON | ON | Background Color |
| ON | OFF | Primary Color |
| OFF | ON | Alternate Color |
| OFF | OFF | Primary Color |

The printer and method of the present invention does adjust the hue or saturation of the dots. It prints saturated dots of a predefined hue. Graphics images that are generated in a full color RGB or CMY environment are converted by the present invention for printing on a 2-color printer such as the PJ1000 Spot Color Printer manufactured by the Ithaca, N.Y. facility of TransAct Technologies, Inc. This is done by reading the full color image into the printer 30 program and converting it to a true color RGB image. The true color image is then processed to remove hue, saturation and all but 3 colors. The first two colors are preferably white and black. The third color is selected to match the color of the color cartridge in the printer. This conversion process can be adjusted by adjusting the saturation points where each color is converted to on or off.

A two-color printer such as the Ithaca POSjet™1000 Printer typically has white (the paper), black (an ink cartridge), and one other premixed color (for example, red). The printer does not mix the inks on the paper. It either leaves the paper color, prints a black dot, or a color dot. To allow the printer to use colors other than red, the architecture of the color provides for the sending of three color planes to the printer.

Because the printer does not mix colors, either CMY or RGB color definitions work. RGB color definition is preferable because the colors are closer to those most often used in print, and as a result, RGB color definition generally requires sending less data to the printer. RGB color definition also is convenient for use with Microsoft® Windows® to generate data because it is the same as the display.

When a graphic is created for the 2-color printer, the colors used in the graphic must take into account the fact that colors other than the secondary pen color may print black or may not print at all.

There are some special considerations printing images on a 2-color printer such as the Ithaca POSjet™ Printer. The driver in printer 30 converts colors that the printer cannot print into an image as best it can. Color in the image that the printer does not have will not be printed. An example of this is an image that has green in it being printed on a printer that has black and red print cartridges. The green content in the image is not printed. Conversely, if an image has orange content, then it is printed as red on the printer. This red print would result because orange has a red component to it.

Color intensity also has an impact on how graphic images print on the printer. If a color's intensity is too low, then it is not printed. If a color's intensity is very high, i.e., dark, it may get printed in black.

Figure 2:
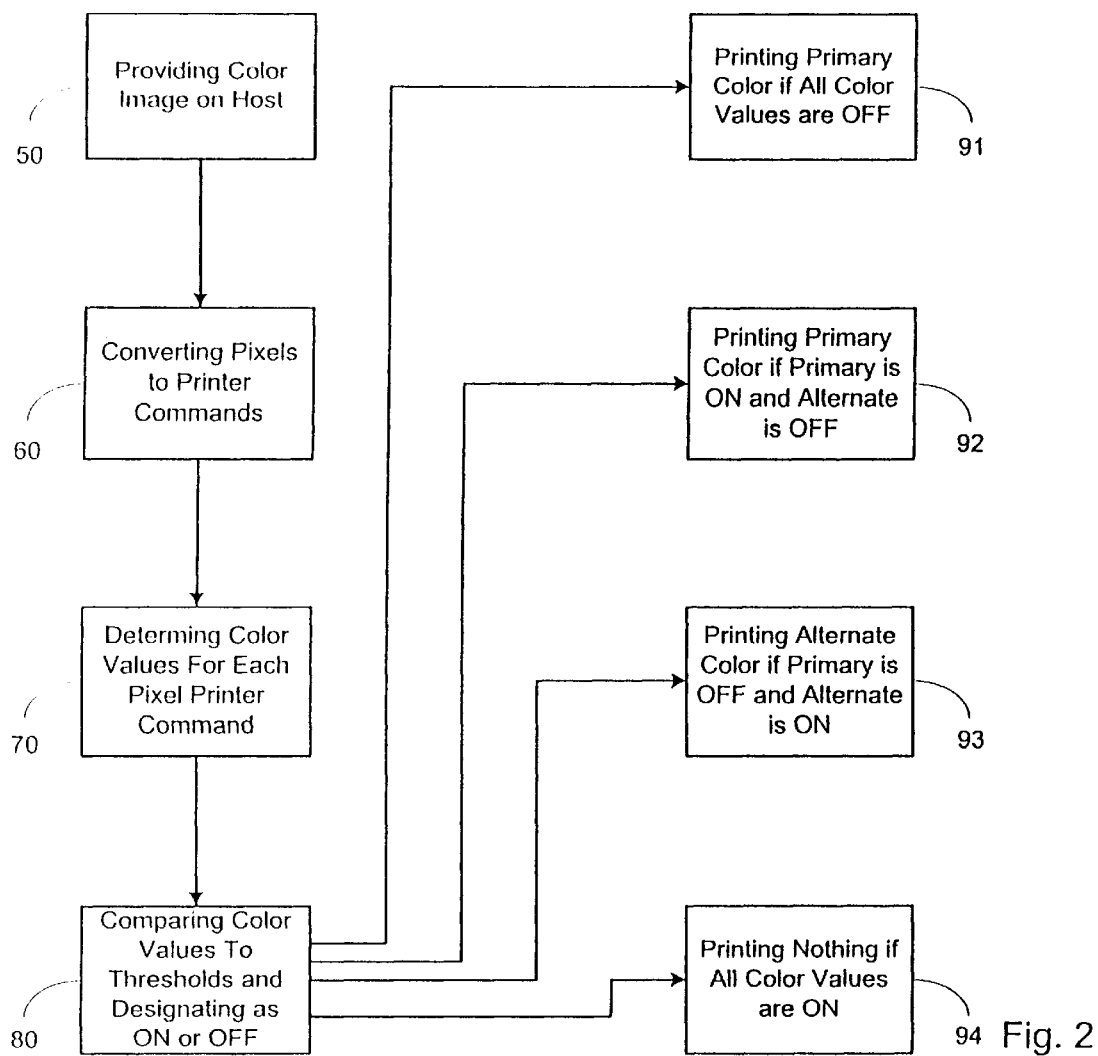
FIG. 2 shows a method for converting a full color image to a three color image according to an embodiment of the present invention.

Referring to FIG. 2, the method of the invention is shown in abbreviated form. The color image is provided on the host in step 50. The pixels of the image are converted in step 60 to printer commands. The color values for each pixel are determined in step 70. Then in step 80, the color values are compared to a specified threshold and designated as either ON or OFF. In step 91 the primary color is printed if all color values are OFF, in step 92 the primary color is printed if the primary is ON and the alternate is OFF, in step 93 the alternate color is printed if the alternate is ON and the primary is OFF, and in step 94 no printing is done if all color values are ON.

While the present invention has been described with reference to a particular preferred embodiment and the accompanying drawings, it will be understood by those skilled in the art that the invention is not limited to the preferred embodiment and that various modifications and the like could be made thereto without departing from the scope of the invention as defined in the following claims.

What is claimed is:

1. A method of converting a full color image to a three color image, wherein said three colors are a primary color, an alternate color, and a background color, comprising:
   providing a color image on a host computer as display pixels, wherein said color image includes a combination of none, one, two, or all three of a first color, a second color, and a third color;
   converting each pixel to a corresponding printer command;
   determining a first color value, a second color value, and a third color value for each of said printer commands based on an intensity of said first color, said second color, and said third color present in said pixel;
   comparing each of first, second, and third color values for each printer command to a given threshold and designating a color value as ON if it exceeds a given threshold, and designating a color value as OFF if it is below or equal to said given threshold; and
   printing each printer command as
      (a) said primary color if all color values for said printer command are OFF,
      (b) said primary color if said first color value is ON and said second and third color values are OFF and said primary color is said first color;
      (c) said alternate color if said first color value is ON and said second and third color values are OFF and said alternate color is said first color; and
      (d) no color if all color values for said printer command are ON.

2. A method according to claim 1, wherein said first, second, and third colors are red, green, and blue, in any order.

3. A method according to claim 1, wherein said first, second, and third colors are cyan, magenta, and yellow, in any order.

4. An apparatus for converting a full color image to a three color image, wherein said three colors are a primary color, an alternate color, and a background color, comprising:
   means for providing a color image on a host computer as display pixels, wherein said color image includes a combination of none, one, two, or all three of a first color, a second color, and a third color;
   means for converting each pixel to a corresponding printer command;
   means for determining a first color value, a second color value, and a third color value for each of said printer commands based on an intensity of said first color, said second color, and said third color present in said pixel;
   means for comparing each of first, second, and third color values for each printer command to a given threshold and designating a color value as ON if it exceeds a given threshold, and designating a color value as OFF if it is below or equal to said given threshold; and
   means for printing each printer command as
      (a) said primary color if all color values for said printer command are OFF,
      (b) said primary color if said first color value is ON and said second and third color values are OFF and said primary color is said first color;
      (c) said alternate color if said first color value is ON and said second and third color values are OFF and said alternate color is said first color; and
      (d) no color if all color values for said printer command are ON.

5. A method according to claim 4, wherein said first, second, and third colors are red, green, and blue, in any order.

6. A method according to claim 4, wherein said first, second, and third colors are cyan, magenta, and yellow, in any order.

* * * * *